United States Patent
Nohara et al.

(10) Patent No.: US 8,110,625 B2
(45) Date of Patent: Feb. 7, 2012

(54) RUBBER COMPOSITION

(75) Inventors: Daisuke Nohara, Tokyo (JP); Masaaki Tsuchihashi, Wakayama (JP); Isao Nishi, Wakayama (JP); Tetsuo Takano, Wakayama (JP)

(73) Assignees: Bridgestone Corporation, Tokyo (JP); Kao Corporation, Tokyo (JP)

( * ) Notice: Subject to any disclaimer, the term of this patent is extended or adjusted under 35 U.S.C. 154(b) by 0 days.

(21) Appl. No.: 12/850,262

(22) Filed: Aug. 4, 2010

(65) Prior Publication Data

US 2010/0298488 A1 Nov. 25, 2010

Related U.S. Application Data

(62) Division of application No. 10/491,272, filed as application No. PCT/JP02/10376 on Oct. 4, 2002, now Pat. No. 7,799,856.

(30) Foreign Application Priority Data

Oct. 5, 2001 (JP) ................................. 2001-310497

(51) Int. Cl.
*C08K 5/10* (2006.01)

(52) U.S. Cl. ........ 524/317; 524/315; 524/236; 524/262; 524/571; 524/575.5

(58) Field of Classification Search .................. 524/317, 524/315, 262, 236, 571, 575.5
See application file for complete search history.

(56) References Cited

U.S. PATENT DOCUMENTS

| | | | |
|---|---|---|---|
| 4,857,257 A | 8/1989 | Chen et al. |
| 4,955,966 A | 9/1990 | Yuki et al. |
| 6,008,304 A | 12/1999 | Nohara et al. |
| 6,130,277 A | 10/2000 | Okamura et al. |
| 6,359,046 B1 | 3/2002 | Cruse |
| 2004/0171725 A1 | 9/2004 | Richardson et al. |

FOREIGN PATENT DOCUMENTS

| | | |
|---|---|---|
| EP | 0 151 212 A1 | 8/1985 |
| EP | 0 405 982 A1 | 1/1991 |
| EP | 0 447 066 A1 | 9/1991 |
| EP | 0 638 610 A1 | 2/1995 |
| EP | 0 867 468 A1 | 9/1998 |
| EP | 1 026 196 A2 | 8/2000 |
| JP | 61-221242 A | 10/1986 |
| JP | 63-309538 A | 12/1988 |
| JP | 6-306211 | 11/1994 |
| JP | 7-26066 A | 1/1995 |
| JP | 10-251448 A | 9/1998 |
| JP | 2000-296702 A | 10/2000 |

OTHER PUBLICATIONS

Zaborski et al., "Interface interactions in elastomeric composites", Sep. 1998, Instytut Chemii Przemyslowej, 129:31936.
Database WPI, Section Ch, Week 199503 (XP-002350031), Derwent Publications Ltd. (corresponding to JP-A 06-306211).

*Primary Examiner* — Peter D Mulcahy
(74) *Attorney, Agent, or Firm* — Sughrue Mion, PLLC

(57) ABSTRACT

Provided is a rubber composition comprising an inorganic filler, a compound having at least one group A reacting with a rubber and two or more groups B adsorbing on the inorganic filler described above in the same molecule, a compound having the group A reacting with a rubber and an amino group in the same molecule or acrylate or methacrylate having a specific structure and further comprising, if necessary, a silane coupling agent. This makes it possible to provide a rubber composition which is excellent in the dispersibility of an inorganic filler, so that it does not elevate a viscosity of a non-vulcanized rubber and does not damage the processability and which does not bring about roughening on the surface of a rubber and is improved in a storage modulus.

9 Claims, No Drawings

RUBBER COMPOSITION

CROSS REFERENCE TO RELATED APPLICATIONS

This is a divisional of application Ser. No. 10/491,272 filed Mar. 31, 2004, which is a National Stage Application of PCT/JP02/10376, filed Oct. 4, 2002. The entire disclosure of the prior application, application Ser. No. 10/491,272, is considered part of the disclosure of this divisional application and is hereby incorporated by reference. This application claims priority from Japanese Patent Application No. 2001-310497, filed on Oct. 5, 2001, the disclosure of which is incorporated herein in its entirety by reference.

BACKGROUND OF THE INVENTION

The present invention relates to a rubber composition, more specifically to a rubber composition which comprises an inorganic filler as a reinforcing filler and which is improved in a processability and a storage modulus, a rubber composition improved in a storage modulus, a storage modulus-improving agent used for a rubber composition and a tire using the above composition.

RELATED ART

Carbon black has so far been used as a reinforcing filler for a rubber in many cases. This is because carbon black can provide a high reinforcing property and an excellent abrasion resistance as compared with the other fillers. On the other hand, when intending to reduce heat generation of rubber for a tire for the purpose of saving consumption of fuel in automobiles in order to meet social demand for energy saving in recent years, it is considered to reduce a filling amount of carbon black or use carbon black having a large particle diameter. However, it is known that the reinforcing property, the abrasion resistance and the gripping property on a wet road are unavoidably lowered in any cases. On the other hand, silicate hydrate (wet silica) is known as a filler which allows the low heat-generating property to stand together with the gripping property on a wet road, and filed is a large number of patents such as, for example, Japanese Patent Application Laid-Open No. 252431/1991, Japanese Patent Application Laid-Open No. 248116/1994, Japanese Patent Application Laid-Open No. 70369/1995, Japanese Patent Application Laid-Open No. 188466/1995, Japanese Patent Application Laid-Open No. 196850/1995, Japanese Patent Application Laid-Open No. 225684/1996, Japanese Patent Application Laid-Open No. 245838/1996 and Japanese Patent Application Laid-Open No. 337687/1996.

In this wet silica, however, the particles themselves tend to coagulate due to the hydrogen bond of a silanol group which is a surface functional group, so that mixing time has to be extended in order to improve the dispersion of silica into a rubber. Also, there has been the defect that the insufficient dispersion of silica into a rubber elevates a Mooney viscosity of the rubber composition and deteriorates the processability such as extrusion. Further, there have been the defects that because of acidity on the surface of silica particles, a base substance which is used as a vulcanization-accelerating agent is adsorbed thereon and the rubber is not sufficiently vulcanized and that hence the storage modulus is not enhanced.

A silane coupling agent has been developed in order to improve the defects described above, but the dispersion of silica has not reached a satisfactory level as yet. In particular, it has been difficult to industrially obtain the good dispersion of silica. In order to improve the storage modulus which contributes to a driving stability of a tire, available are methods such as increasing a blending amount of a reinforcing filler such as carbon and silica and blending a filler having a smaller particle size, but a non-vulcanized rubber is not avoided from being deteriorated in a processability in any cases. Further, a method in which some kind of a hardening resin is added is available as well, but it has the demerit that the heat generating property is deteriorated.

On the other hand, methods in which a resin is added are disclosed as a method for elevating a driving stability without damaging a fuel-saving property of a silica-blended rubber in Japanese Patent Application Laid-Open No. 80205/2000 and Japanese Patent Application Laid-Open No. 290433/2000. However, a compatibility of these resins with a rubber is unsatisfactory, and brought about is the problem that the surface of the vulcanized rubber is roughened.

Further, a rubber composition to which a compound having a polymerizable unsaturated bond and a specific functional group is added is proposed in Japanese Patent Application Laid-Open No. 179841/2002, but the effect of enhancing the storage modulus has been unsatisfactory in these compounds.

DISCLOSURE OF THE INVENTION

Under such circumstances, an object of the present invention is to provide a rubber composition which is excellent in the dispersibility of an inorganic filler, so that a viscosity of the non-vulcanized rubber is not elevated and the processability thereof is not damaged and which does not roughen the surface of the rubber and is improved in a storage modulus, and a tire using the above rubber composition.

Intensive researches repeated by the present inventors in order to achieve the object described above has resulted in finding that the above object can be achieved by a rubber composition characterized by comprising (A) a natural rubber and/or a diene base synthetic rubber, (B) an inorganic filler and at least one of (C) a compound having in the same molecule, at least one group A reacting with the rubber (A) and two or more groups B adsorbing on the inorganic filler (B) described above, (D) a compound having in the same molecule, each at least one of the group A reacting with the rubber (A), which is derived from an unsaturated carboxylic acid selected from maleic acid, fumaric acid, itaconic acid and sorbic acid and an amino group and (E) a compound selected from acrylate and methacrylate each having a specific structure, a storage modulus-improving agent comprising (C), (D) or (E) as an active ingredient and a tire using the above rubber composition. The present invention has been completed based on such knowledge.

BEST MODE FOR CARRYING OUT THE INVENTION

The rubber composition in the present invention comprises (A) the natural rubber and/or the diene base synthetic rubber as an essential component, and in this case, the diene base synthetic rubber includes, for example, a polyisoprene synthetic rubber (IR), a polybutadiene rubber (BR), a styrene-butadiene rubber (SBR), an acrylonitrile-butadiene rubber (NBR), a chloroprene rubber (CR) and a butyl rubber (IIR). The natural rubber and the diene base synthetic rubber of this component (A) may be used alone or in combination of two or more kinds thereof.

Next, an inorganic filler is used as the component (B) in the rubber composition of the present invention, and in this case, the inorganic filler means silica or a compound represented by the following Formula (VIII):

$$dM_1 \cdot xSiO_y \cdot zH_2O \qquad \text{(VIII)}$$

wherein $M_1$ is at least one selected from metal selected from the group consisting of aluminum, magnesium, titanium, calcium and zirconium, oxides or hydroxides of these metals, hydrates thereof and carbonates of these metals, and d, x, y and z each are an integer of 1 to 5, an integer of 0 to 10, an integer of 2 to 5 and an integer of 0 to 10.

When both of x and z are 0 in Formula (VIII), the above inorganic compound is at least one metal selected from aluminum, magnesium, titanium, calcium and zirconium, a metal oxide or a metal hydroxide thereof.

Capable of being used as the inorganic filler represented by Formula (VIII) are alumina ($Al_2O_3$) such as γ-alumina and α-alumina, alumina monohydrate ($Al_2O_3 \cdot H_2O$) such as boehmite and diaspore, aluminum hydroxide [$Al(OH)_3$] such as gibbsite and bayerite, aluminum carbonate [$(Al_2(CO_3)_2$], magnesium hydroxide [$Mg(OH)_2$], magnesium oxide (MgO), magnesium carbonate ($MgCO_3$), talc ($3MgO \cdot 4SiO_2 \cdot H_2O$), attapulgite ($5MgO \cdot 8SiO_2 \cdot 9H_2O$), titanium white ($TiO_2$), titanium black ($TiO_{2n-1}$), calcium oxide (CaO), calcium hydroxide [$Ca(OH)_2$], aluminum magnesium oxide ($MgO \cdot Al_2O_3$), clay ($Al_2O_3 \cdot 2SiO_2$), kaoline ($Al_2O_3 \cdot 2SiO_2 \cdot 2H_2O$), pyrophyllite ($Al_2O_3 \cdot 4SiO_2 \cdot H_2O$), bentonite ($Al_2O_3 \cdot 4SiO_2 \cdot 2H_2O$), aluminum silicate ($Al_2SiO_5$, $Al_4 \cdot 3SiO_4 \cdot 5H_2O$ and the like), magnesium silicate ($Mg_2SiO_4$, $MgSiO_3$ and the like), calcium silicate ($Ca_2 \cdot SiO_4$ and the like), aluminum calcium silicate ($Al_2O_3 \cdot CaO \cdot 2SiO_2$ and the like), magnesium calcium silicate ($CaMgSiO_4$), calcium carbonate ($CaCO_3$), zirconium oxide ($ZrO_2$), zirconium hydroxide [$ZrO(OH)_2 \cdot nH_2O$], zirconium carbonate [$Zr(CO_3)_2$] and crystalline aluminosilicates containing hydrogen, an alkaline metal or an alkaline earth metal each correcting a charge as is the case with various zeolites. $M_1$ in Formula (VIII) is preferably at least one selected from aluminum metal, oxides or hydroxides of aluminum, hydrates thereof and carbonates of aluminum.

These inorganic compounds represented by Formula (VIII) may be used alone or in combination of two or more kinds thereof. Further, these compounds can be used as well in a mixture with silica.

In the present invention, silica is particularly preferred among the inorganic fillers described above.

The inorganic filler in the present invention is preferably a powder having a particle diameter of 0.01 to 10 μm. If the particle diameter is less than 0.01 μm, the mixing work is deteriorated in spite of expecting no rise in the gripping force. On the other hand, if it exceeds 10 μm, the storage modulus is extremely reduced, and the abrasion resistance is deteriorated. Accordingly, both are not preferred. From the viewpoint of these effects, the particle diameter falls more preferably in a range of 0.05 to 5 μm.

A filler in which a specific surface area measured by a mercury penetration method falls in a range of 80 to 300 $m^2/g$ is preferably used for the inorganic filler described above. Controlling this specific surface area to 80 to 300 $m^2/g$ makes the dispersion of the inorganic filler into rubber better and improves a processability and an abrasion resistance of the rubber composition. More preferred specific surface area falls in a range of 100 to 250 $m^2/g$ in terms of a balance between the reinforcing property, the processability and the abrasion resistance. This specific surface area ($S_{HG}$) is calculated from $S_{HG}$ ($m^2/g$)=2V/r [V=whole pore volume ($m^3/g$) and r=average pore radius (m)] supposing that the pore is cylindrical.

In the composition of the present invention, a content of the inorganic filler of the component (B) falls preferably in a range of 10 to 140 mass parts per 100 mass parts of the component (A) described above. Controlling this content to 10 to 140 mass parts makes it possible to achieve the object of the present invention without exerting an adverse effect on the rubber physical properties such as the reinforcing property and the others. This content of the component (B) is more preferably 20 to 90 mass parts.

The compound (C) having in the same molecule, at least one group A reacting with the rubber and two or more groups B adsorbing on the inorganic filler according to the present invention is an active ingredient of an additive for elevating primarily a storage modulus of the rubber composition according to the present invention. The group A reacting with the rubber is preferably a group which has a double bond and to which a group activating the above double bond is adjacent and particularly preferably a non-aromatic conjugated double bond group or a group in which a group selected from a carbonyl group, a carboxyl group, an oxycarbonyl group and an amide group is adjacent to the double bond. In this case, the term "adjacent" means to have a group selected from a carbonyl group, a carboxyl group, an oxycarbonyl group and an amide group at both ends or one end of the double bond.

In the compound (C) of the present invention, the reacting group A is preferably a group derived from an unsaturated carboxylic acid selected from maleic acid, fumaric acid, itaconic acid, acrylic acid, methacrylic acid and sorbic acid, specifically a group derived from maleic acid, fumaric acid, itaconic acid and acrylic acid and particularly preferably a group derived from maleic acid and acrylic acid. The adsorbing group B is preferably a carboxyl group.

Further, the compound (C) has more preferably an oxyalkylene group. The oxyalkylene group contained therein elevates the compatibility with the rubber and improves the affinity with the inorganic filler (B). An average addition mole number of the oxyalkylene group falls in a range of preferably 1 to 30 mole, more preferably 1 to 20 mole and particularly preferably 2 to 15 mole per group A reacting with the rubber.

The specific examples of the compound (C) include mono (meth)acryloyloxyalkyl esters of polycarboxylic acids such as trimellitic acid, pyromellitic acid and citric acid (wherein (meth)acryloyl represents methacryloyl or acryloyl); (poly) esters of unsaturated carboxylic acids with oxycarboxylic acids, such as monomalic acid maleate; esters, which have carboxylic acids at both ends, of diols such as ethylene glycol, hexanediol and cyclohexanedimethanol with unsaturated dicarboxylic acids such as maleic acid, fumaric acid and itaconic acid; N-(carboxyalkyl)maleamic acid such as N-(2-carboxyethyl)maleamic acid; and a compound represented by the following Formula (I), (II) or (III):

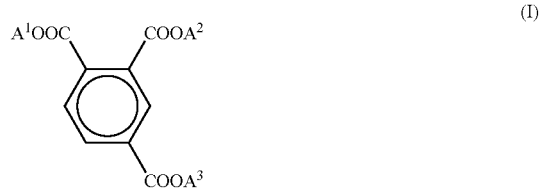

wherein one of $A^1$, $A^2$ and $A^3$ is a group represented by —$(R^1O)_n$—CO—$CR^2$=$CR^3$—$R^4$, and the others are hydrogen atoms, in which $R^1$ is an alkylene group having 2 to 4 carbon atoms, preferably ethylene group or propylene group; $R^2$, $R^3$ and $R^4$ each are independently a hydrogen atom or methyl group; preferably, $R^2$ is a hydrogen atom or methyl group, and $R^3$ and $R^4$ are hydrogen atoms; n is a number of 1 to 30, preferably 1 to 20 and more preferably 2 to 15 which shows an average addition mole number of an oxyalkylene group;

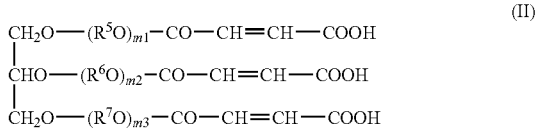

(II)

wherein $R^5$, $R^6$ and $R^7$ each are independently an alkylene group having 2 to 4 carbon atoms, preferably ethylene group or propylene group; m1, m2 and m3 each are numbers showing an average addition mole number of an oxyalkylene group, and they are numbers in which m1+m2+m3 is 90, preferably 3 to 60 and more preferably 6 to 45;

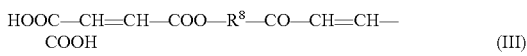

(III)

wherein $R^8$ is a group represented by —$R^9$O—, a group represented by —($R^{10}$O)$_s$—, a group represented by —CH$_2$CH(OH)CH$_2$O— or a group represented by —($R^{11}$O—COR$^{12}$—COO—)$_t$R$^{11}$O—, in which $R^9$ is an alkylene group having 2 to 36 carbon atoms, an alkenylene group having 2 to 36 carbon atoms or a divalent aromatic hydrocarbon group, preferably an alkylene group having 2 to 18 carbon atoms or a phenylene group and more preferably an alkylene group having 4 to 12 carbon atoms; $R^{10}$ is an alkylene group having 2 to 4 carbon atoms, preferably ethylene group or propylene group; s is a number of 1 to 60, preferably 2 to 40 and more preferably 4 to 30 which shows an average addition mole number of an oxyalkylene group; $R^{11}$ is an alkylene group having 2 to 18 carbon atoms, an alkenylene group having 2 to 18 carbon atoms, a divalent aromatic hydrocarbon group or —($R^{13}$O)$_u$R$^{13}$— ($R^{13}$ is an alkylene group having 2 to 4 carbon atoms, and u is a number of 1 to 30, preferably 1 to 20 and more preferably 2 to 15 which shows an average addition mole number of an oxyalkylene group); $R^{12}$ is an alkylene group having 2 to 18 carbon atoms, an alkenylene group having 2 to 18 carbon atoms or a divalent aromatic hydrocarbon group, preferably an alkylene group having 2 to 12 carbon atoms or a phenylene group and more preferably an alkylene group having 2 to 8 carbon atoms; and t is a number of 1 to 30, preferably 1 to 20, more preferably 1 to 15 in terms of an average value.

Among these compounds, the partial esters of polybasic acids are preferred, and the compounds selected from the compounds represented by Formula (I), (II) or (III) are more preferred.

The specific examples of the compound represented by Formula (I) include mono(ω-(meth)acryloyloxyPOA(n)) trimellitate (wherein (meth)acryloyl represents methacryloyl or acryloyl, and POA(n) represents polyoxyethylene (hereinafter abbreviated to as [POE]) or polyoxypropylene (hereinafter abbreviated as [POP]) in which 1 to 30 mole on the average of oxyethylene or oxypropylene is added) such as mono(2-(meth)acryloyloxyethyl) trimellitate, mono[2-(2-(meth) acryloyloxyethoxy)ethyl]trimellitate and mono(ω-(meth) acryloyloxypolyoxyethylene(10)) trimellitate.

The specific examples of the compound represented by Formula (II) include POA(m)glycerin trimaleate (wherein POA(m) represents polyoxyethylene or polyoxypropylene in which 0 to 90 mole on the average of oxyethylene or oxypropylene is added) such as POE(8)glycerin trimaleate, POE(3) glycerin trimaleate and POP(10)glycerin trimaleate.

The specific examples of the compound represented by Formula (III) include dimaleates of alkylenediols such as glycerin dimaleate, 1,4-butanediol dimaleate and 1,6-hexanediol dimaleate, difumarates of alkylenediols such as 1,6-hexanediol difumarate, dimaleates of polyoxyalkylene glycols such as PEG 200 dimaleate and PEG 600 dimaleate (wherein PEG 200 and PEG 600 each represent polyethylene glycol having an average molecular weight of 200 or 600), both end-carboxylic acid type alkylene glycol/maleic acid polyesters such as polybutylene maleate having carboxyl groups at both ends and poly(PEG 200) maleate having carboxyl groups at both ends, polybutylene adipate maleate having carboxyl groups at both ends, difumarate of polyoxyalkylene glycol such as PEG 600 difumarate and both end-carboxylic acid type alkylene glycol/fumaric acid polyesters such as polybutylene fumarate having carboxyl groups at both ends and poly(PEG 200) fumarate having carboxyl groups at both ends.

The compound (C) described above has a molecular weight falling in a range of preferably 250 or more, more preferably 250 to 5000 and particularly preferably 250 to 3000. If the molecular weight falls in this range, not only it has a high flash point and is desirable from a safety point of view, but also it has less smoke and is preferred in terms of work environment.

A content of the compound (C) which is an active ingredient contained in the storage modulus-improving agent (C) for the inorganic filler-blended rubber of the present invention falls in a range of preferably 50 to 100 mass %, more preferably 80 to 100 mass %.

In the present invention, the compound (C) may be used alone or in combination of two or more kinds thereof. Also, unreacted matters produced in the production process for the compound (C) may be contained in the above storage modulus-improving agent for the rubber. Further, a process oil and esters other than those used in the present invention can be contained therein. Further, the above storage modulus-improving agent for the rubber is preferably used after carried on a fine particle of silica and the like from the viewpoint of handling.

Next, the compound (D) having the group A reacting with the rubber (A) and an amino group in the same molecule according to the present invention is an active ingredient contained in the additive for elevating a storage modulus of the rubber composition as is the case with the compound (C), and it is essential that the reacting group A is a group derived from an unsaturated carboxylic acid selected from maleic acid, fumaric acid, itaconic acid and sorbic acid. Among them, the reacting group A is preferably a group derived from maleic acid, fumaric acid or itaconic acid, particularly preferably a group derived from maleic acid.

Also, the amino group is preferably a tertiary amino group, and it is more preferably a group derived from an aliphatic tertiary amino group.

The specific examples of the compound (D) include N,N-dialkyl (the alkyl group has 1 to 4 carbon atoms)aminoalkyl (the alkyl group has 1 to 22, preferably 4 to 22 carbon atoms) esters of unsaturated carboxylic acids selected from maleic acid, fumaric acid, itaconic acid and sorbic acid, N-alkyl (the alkyl group has 6 to 22 carbon atoms)-N-(alkyl or hydroxyalkyl (the alkyl group or the hydroxyalkyl group has 1 to 4 carbon atoms))aminoalkyl (the alkyl group has 1 to 4 carbon atoms) esters of the unsaturated carboxylic acids described above and N-[N',N'-dialkyl (the alkyl group has 1 to 4 carbon atoms)aminoalkyl (the alkyl group has 1 to 22, preferably 4 to 22 carbon atoms)]amides of the unsaturated carboxylic acids described above. Preferred are N,N-dialkyl (the alkyl group has 1 to 4 carbon atoms)aminoalkyl (the alkyl group has 1 to 22, preferably 4 to 22 carbon atoms) esters of maleic acid, N-alkyl (the alkyl group has 6 to 22 carbon atoms)-N-(alkyl or hydroxyalkyl (the alkyl group or the hydroxyalkyl group has 1 to 4 carbon atoms))aminoalkyl (the alkyl group has 1 to 4 carbon atoms) esters of maleic acid and N-[N',N'-dialkyl (the alkyl group has 1 to 4 carbon atoms)aminoalkyl (the alkyl group has 1 to 22, preferably 4 to 22 carbon atoms)]amides of maleic acid.

A content of the compound (D) which is an active ingredient contained in the storage modulus-improving agent (D) for the inorganic filler-blended rubber of the present invention falls in a range of preferably 50 to 100 mass %, more preferably 80 to 100 mass %.

In the present invention, the compound (D) may be used alone or in combination of two or more kinds thereof. Also, unreacted matters produced in the production process for the compound (D) may be contained in the storage modulus-improving agent for the above rubber. Further, a process oil and esters other than those used in the present invention can be contained therein. Further, the above storage modulus-improving agent for the rubber is preferably used after carried on a fine particle of silica and the like from the viewpoint of handling.

Further, (E) acrylate or methacrylate represented by Formula (IV):

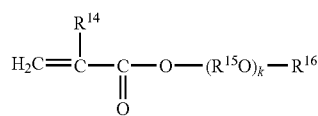

(IV)

is suitably used. In Formula (IV) described above, $R^{14}$ represents hydrogen or methyl group; $R^{15}$ represents ethylene group or propylene group; $R^{16}$ represents a saturated or unsaturated alkyl group, an aryl group or a group which is substituted with —OH, —COOH or —(C=O)— partially or at two or more parts and which has a carboxyl group at an end of a $R^{16}$ part; and k is an integer of 0 to 30. The above acrylate or methacrylate has a molecular weight of 250 or more.

The alkyl group described above may be linear, branched or cyclic, and the examples thereof include various octyl groups (n-octyl, branched octyl and cyclooctyl; hereinafter the same shall apply), various nonyl groups, various decyl groups, various dodecyl groups, various tetradecyl groups, various hexadecyl groups, various octadecyl groups, various behenyl groups, various octenyl groups, various decenyl groups and oleyl groups. The aryl group may have a substituent such as a lower alkyl group on an aromatic ring, and the examples thereof include a phenyl group, various tolyl groups, various xylyl groups, an α- or β-naphthyl group, various methylnaphthyl groups and various dimethylnaphthyl groups.

The examples of the formula described above include 2-methacryloyloxyethyl hexahydrophthalate, 2-acryloyloxyethyl phthalate and 2-acryloyloxyethyl hexahydrophthalate.

A content of the compound (E) which is an active ingredient contained in the storage modulus-improving agent (E) for the inorganic filler-blended rubber of the present invention falls in a range of preferably 50 to 100 mass %, more preferably 80 to 100 mass %.

In the present invention, the compound (E) may be used alone or in combination of two or more kinds thereof. Also, unreacted matters produced in the production process for the compound (E) may be contained in the above storage modulus-improving agent for the rubber. Further, a process oil and esters other than those used in the present invention can be contained therein. Further, the above storage modulus-improving agent for the rubber is preferably used after carried on a fine particle of silica and the like from the viewpoint of handling.

The compound (C), the compound (D) and the compound (E) of the present invention are added in an amount falling in a range of preferably 0.1 to 10 mass parts, more preferably 0.5 to 6 mass parts per 100 mass parts of the rubber component.

Also, the storage modulus-improving agent (C), (D) or (E) of the present invention preferably further contains an aliphatic amine (F). In this case, the aliphatic amine is preferably an aliphatic tertiary amine and more preferably an amine represented by Formula (VIII):

(VIII)

wherein $R^{17}$ represents an alkyl group having 4 to 24 carbon atoms, preferably an alkyl group having 8 to 22 carbon atoms, and $R^{18}$ and $R^{19}$ each represent an alkyl group having 1 to 8 carbon atoms, preferably an alkyl group having 1 to 2 carbon atoms.

A ratio (C)/(F), (D)/(F) or (E)/(F) of the component (C), (D) or (E) to the component (F) falls in a range of preferably 0.1 to 10, particularly preferably 0.2 to 5. Further, an amount of the component (F) falls in a range of preferably 0.1 to 10 mass parts, more preferably 0.5 to 6 mass parts per 100 mass parts of the rubber (A).

In the rubber composition of the present invention, a silane coupling agent (G) is preferably added, if desired, in order to further enhance the effects of the present invention. Optional ones selected from silane coupling agents which have so far publicly been known can be used for this silane coupling agent. In particular, preferably used is at least one selected from a compound represented by Formula (V):

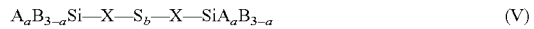

(V)

(wherein A represents $C_cH_{2c+1}O$ (c is an integer of 1 to 3) or a chlorine atom; B represents an alkyl group having 1 to 3 carbon atoms; X represents a saturated or unsaturated alkylene group having 1 to 9 carbon atoms or an arylene group having 7 to 15 carbon atoms; a is an integer of 1 to 3, and b is an integer of 1 or more and may have distribution, provided that when a is 1, two B's may be the same or different, and when a is 2 or 3, two or three A's may be the same or different), a compound represented by Formula (VI):

(VI)

(wherein A, B, X and a are the same as described above, and Y represents a mercapto group, a vinyl group, an amino group, a glycidoxy group or an epoxy group) and a compound represented by Formula (VII):

(VII)

(wherein A, B, X, a and b are the same as described above, and Z represents a benzothiazolyl group, an N,N-dimethylthiocarbamoyl group, a methacryloyl group or a saturated or unsaturated hydrocarbon group having 1 to 15 carbon atoms).

The examples of the silane coupling agent represented by Formula (V) include bis(3-triethoxysilylpropyl) tetrasulfide, bis(3-trimethoxysilylpropyl) tetrasulfide, bis(3-methyldimethoxysilylpropyl) tetrasulfide, bis(3-triethoxysilylethyl) tetrasulfide, bis(3-triethoxysilylpropyl) disulfide, bis(3-trimethoxysilylpropyl) disulfide and bis(3-triethoxysilylpropyl) trisulfide; the examples of the silane coupling agent represented by Formula (VI) include 3-mercaptopropyltrimethoxysilane, 3-mercaptopropyltriethoxysilane, vinyltriethoxysilane, vinyltrimethoxysilane, 3-aminopropyltriethoxysilane, 3-aminopropyltrimethoxysilane, 3-mercaptopropylmethyldimethoxysilane, Y-glycidoxypropyltrimethoxysilane and Y-glycidoxypropylmethyldiethoxysilane; and the examples of the silane coupling agent represented by Formula (VII) include 3-trimethoxysilylpropyl-N,N-dimethylcarbamoyl tetrasulfide, 3-trimethoxysilylpropylbenzothiazolyl tetrasulfide, 3-trimethoxysilylpropylmethacryloyl monosulfide and 3-triethoxysilylpropyl-n-octyl disulfide.

In the present invention, the silane coupling agent of the component (G) used according to desire may be used alone or in combination of two or more kinds thereof. A content thereof in the composition is selected in a range of 1 to 20 mass % based on the component (B) described above. If this content is less than 1 mass %, it is likely that the effects obtained by blending the silane coupling agent are not sufficiently exhibited. On the other hand, if it exceeds 20 mass %, the effects thereof do not grow larger in proportion to the amount thereof, and it is rather economically disadvantageous. Considering the blend effects and the economical efficiency, the preferred content of this silane coupling agent of the component (B) falls in arrange of 3 to mass %.

An addition method of the compounds of (C), (D) and (E) in the present invention shall not specifically be restricted, and they can be added and mixed with the rubber component by means of a conventional mixer, for example, a Banbury mixer, a roll and an intensive mixer.

Further, various additives which are usually used in the rubber industry, for example, carbon black, vulcanizing agents, vulcanization-accelerating agents, antioxidants, scorch inhibitors, softening agents, zinc oxide and stearic acid can be added, if desired, to the rubber composition of the present invention as long as the objects of the present invention are not damaged. The rubber composition of the present invention is suitably used for a tread rubber for a tire and a base tread rubber. A pneumatic tire is produced by a conventional method using the rubber composition of the present invention. That is, the rubber composition of the present invention to which various chemicals are added, if necessary, as described above is extruded and processed into, for example, a member for a tread at a stage where the rubber composition is not vulcanized, and it is stuck and molded by means of a tire molding machine by a conventional method, whereby a crude tire is molded. This crude tire is heated and pressed in a vulcanizing machine, whereby a tire is obtained.

In the case of carbon black among the additives described above, an addition amount thereof falls in a range of 0 to 80 mass parts, preferably 0 to 40 mass parts per 100 mass parts of the rubber. Carbon black is classified into channel black, furnace black, acetylene black and thermal black according to the production processes, and any ones can be used.

EXAMPLES

Next, the present invention shall be explained in further details with reference to examples, but the present invention shall by no means be restricted by these examples.

The physical properties of the rubber compositions obtained in the respective examples were measured by methods shown below.

(1) Dynamic Viscoelasticity

Measurement was carried out based on JIS K7198 by means of DVA-200 manufactured by IT Measurement Control Co., Ltd., wherein a test piece having a length of 2.0 mm, a width of 5 mm and a thickness of 2 mm was used to carry out the measurement at a test temperature of −80 to 100° C., a distortion rate of 2%, a frequency of 50 Hz and a heating speed of 5° C./minute. The values of the storage modulus (E') at 60° C. are shown in terms of an index in Table 1 to Table 4, wherein the indices were obtained by comparing the values of the storage modulus with those of controls (Comparative Examples 1, 5, 9 and 13). It is shown that the larger the index of the storage modulus (E') is, the better the physical properties of the rubber are.

(2) Evaluation of Surface Roughness

The surface state of a test piece (length 200 mm×width 150 mm×thickness about 2 mm) was observed with the naked eye and evaluated according to the following criteria. The absence of the surface roughness shows that a compatibility of the storage modulus-improving agent with the rubber or a dispersibility of the filler is excellent.

○: scratches and dents are not observed at all
Δ: scratches and dents are a little observed
X: scratches and dents are considerably observed (3) Mooney Viscosity The Mooney viscosity [$ML_{1+4}$] was measured at 125° C. based on JIS K6300-1994 and shown in terms of an index, wherein the values of Comparative Examples 1, 5, 9 and 13 were set to 100 respectively. The smaller the numeral, the better the processability.

Examples 1 to 12 and Comparative Examples 1 to 5

The respective components shown in Table 1 were mixed in blending proportions shown in Table 1 to prepare rubber compositions. They were prepared by means of a Banbury mixer and a roll mixer. Vulcanization was carried out at a temperature of 165° C., and the vulcanizing time was prescribed by Curast T 90 value (minute)×1.5 time.

In each of these rubber compositions, the dynamic viscoelasticity, the Mooney viscosity and the surface roughness were evaluated as the indices of the physical properties of the vulcanized rubbers. The results thereof are shown in Table 1. In the dynamic viscoelasticity measuring test and the Mooney viscosity, the values were shown in terms of an index, wherein the value of Comparative Example 1 was set to a reference.

TABLE 1

|  | Example | | | | | |
|---|---|---|---|---|---|---|
|  | 1 | 2 | 3 | 4 | 5 | 6 |
| SBR #1502*[1] | 100 | 100 | 100 | 100 | 100 | 100 |
| Carbon black*[2] | 10 | 10 | 10 | 10 | 10 | 10 |
| Silica*[3] | 40 | 40 | 40 | 40 | 40 | 40 |
| Silane coupling agent*[4] | 4 | 4 | 4 | 4 | 4 | 4 |
| Zinc oxide | 3 | 3 | 3 | 3 | 3 | 3 |

TABLE 1-continued

| | 1 | 2 | 3 | 4 | 5 | 6 |
|---|---|---|---|---|---|---|
| Stearic acid | 2 | 2 | 2 | 2 | 2 | 2 |
| Sulfur | 1.5 | 1.5 | 1.5 | 1.5 | 1.5 | 1.5 |
| Monomalic acid maleate | 2 | | | | | |
| Ethylene glycol dimaleate | | 2 | | | | |
| 1,6-Hexanediol dimaleate | | | 2 | | | |
| N-(2-carboxyethyl)maleamic acid | | | | 2 | | |
| Mono(ω-acryloyloxyPOE(10)) trimellitate*5 | | | | | 2 | |
| Mono(2-methacryloyloxyethyl) trimellitate | | | | | | 2 |
| Mono(ω-methacryloyloxyPOP(9)) trimellitate*5 | | | | | | |
| POE(8)glycerin trimaleate*5 | | | | | | |
| Glycerin dimaleate | | | | | | |
| Polybutylene maleate*6 | | | | | | |
| Poly(PEG 200) maleate*7 | | | | | | |
| Polybutylene adipate maleate*8 | | | | | | |
| Diethyl maleate | | | | | | |
| Caprylic acid | | | | | | |
| Mono(2-methacryloyloxyethyl) succinate | | | | | | |
| Bismaleimide resin*9 | | | | | | |
| Vulcanization-accelerating agent*10 | 2 | 2 | 2 | 2 | 2 | 2 |
| Antioxidant*11 | 1 | 1 | 1 | 1 | 1 | 1 |
| E' index | 147 | 151 | 134 | 127 | 143 | 142 |
| Mooney viscosity (ML$_{1+4}$) | 103 | 102 | 101 | 102 | 98 | 102 |
| Surface roughness | ○ | ○ | ○ | ○ | ○ | ○ |

| | Example | | | | | |
|---|---|---|---|---|---|---|
| | 7 | 8 | 9 | 10 | 11 | 12 |
| SBR #1502*1 | 100 | 100 | 100 | 100 | 100 | 100 |
| Carbon black*2 | 10 | 10 | 10 | 10 | 10 | 10 |
| Silica*3 | 40 | 40 | 40 | 40 | 40 | 40 |
| Silane coupling agent*4 | 4 | 4 | 4 | 4 | 4 | 4 |
| Zinc oxide | 3 | 3 | 3 | 3 | 3 | 3 |
| Stearic acid | 2 | 2 | 2 | 2 | 2 | 2 |
| Sulfur | 1.5 | 1.5 | 1.5 | 1.5 | 1.5 | 1.5 |
| Monomalic acid maleate | | | | | | |
| Ethylene glycol dimaleate | | | | | | |
| 1,6-Hexanediol dimaleate | | | | | | |
| N-(2-carboxyethyl)maleamic acid | | | | | | |
| Mono(ω-acryloyloxyPOE(10)) trimellitate*5 | | | | | | |
| Mono(2-methacryloyloxyethyl) trimellitate | | | | | | |
| Mono(ω-methacryloyloxyPOP(9)) trimellitate*5 | 2 | | | | | |
| POE(8)glycerin trimaleate*5 | | 2 | | | | |
| Glycerin dimaleate | | | 2 | | | |
| Polybutylene maleate*6 | | | | 2 | | |
| Poly(PEG 200) maleate*7 | | | | | 2 | |
| Polybutylene adipate maleate*8 | | | | | | 2 |
| Diethyl maleate | | | | | | |
| Caprylic acid | | | | | | |
| Mono(2-methacryloyloxyethyl) succinate | | | | | | |
| Bismaleimide resin*9 | | | | | | |
| Vulcanization-accelerating agent*10 | 2 | 2 | 2 | 2 | 2 | 2 |
| Antioxidant*11 | 1 | 1 | 1 | 1 | 1 | 1 |
| E' index | 132 | 136 | 141 | 145 | 147 | 133 |
| Mooney viscosity (ML$_{1+4}$) | 98 | 96 | 101 | 96 | 94 | 95 |
| Surface roughness | ○ | ○ | ○ | ○ | ○ | ○ |

| | Comparative Example | | | | |
|---|---|---|---|---|---|
| | 1 | 2 | 3 | 4 | 5 |
| SBR #1502*1 | 100 | 100 | 100 | 100 | 100 |
| Carbon black*2 | 10 | 10 | 10 | 10 | 10 |
| Silica*3 | 40 | 40 | 40 | 40 | 40 |
| Silane coupling agent*4 | 4 | 4 | 4 | 4 | 4 |
| Zinc oxide | 3 | 3 | 3 | 3 | 3 |
| Stearic acid | 2 | 2 | 2 | 2 | 2 |
| Sulfur | 1.5 | 1.5 | 1.5 | 1.5 | 1.5 |
| Monomalic acid maleate | | | | | |
| Ethylene glycol dimaleate | | | | | |
| 1,6-Hexanediol dimeleate | | | | | |
| N-(2-carboxyethyl) malaamic acid | | | | | |
| Mono(ω-acryloyloxyPOE(10)) trimellitate*5 | | | | | |
| Mono(2-methacryloyloxyethyl) trimellitate | | | | | |
| Mono(ω-methacryloyloxyPOP(9)) trimellitate*5 | | | | | |
| POE(8)glycerin trimaleate*5 | | | | | |
| Glycerin dimaleate | | | | | |
| Polybutylene maleate*6 | | | | | |
| Poly(PEG 200) maleate*7 | | | | | |
| Polybutylene adipate maleate*8 | | | | | |

TABLE 1-continued

| | | | | | |
|---|---|---|---|---|---|
| Diethyl maleate | | | 2 | | |
| Caprylic acid | | 2 | | | |
| Mono(2-methacryloyloxyethyl) succinate | | | | 2 | |
| Bismaleimide resin*9 | | | | | 2 |
| Vulcanization-accelerating agent*10 | 2 | 2 | 2 | 2 | 2 |
| Antioxidant*11 | 1 | 1 | 1 | 1 | 1 |
| E' index | 100 | 98 | 95 | 110 | 123 |
| Mooney viscosity ($ML_{1+4}$) | 100 | 95 | 93 | 96 | 101 |
| Surface roughness | ○ | ○ | ○ | ○ | X |

*1 manufactured by JSR Co., Ltd.
*2 Seast 300 manufactured by Tokai Carbon Co., Ltd.
*3 Nipseal AQ ($S_{HG}$ = 140 m$^2$/g: obtained by granulating Nipseal VN3) manufactured by Nippon Silica Co., Ltd.
*4 Bis(3-triethoxysilylpropyl) tetrasulfide
*5 POE(n) represents polyoxyethylene in which n mole of oxyethylene is added, and POP(n) represents polyoxypropylene in which n mole of oxypropylene is added
*6 a compound in which in Formula (III), $R^8$ is a group represented by-($R^{11}$O—$COR^{12}$—COO—)$_r R^{11}$O—; $R^{11}$ is butylene group; $R^{12}$ is —CH=CH—; and t is 4
*7 a compound in which in Formula (III), $R^8$ is a group represented by-($R^{11}$O—$COR^{12}$—COO—)$_r R^{11}$O—; $R^{11}$ is —($R^{13}$O)$_u R^{13}$— ($R^{13}$ is ethylene group, and u is 3.5); $R^{12}$ is —CH=CH—; and t is 4
*8 a compound in which in Formula (III), $R^8$ is a group represented by-($R^{11}$O—$COR^{12}$—COO—)$_r R^{11}$O—; $R^{11}$ is butylene group; $R^{12}$ is butylene group; and t is 4
*9 Bismaleimidetriazine resin, manufactured by Mitsubishi Gas Chemical Co., Ltd., using BT-2680 which was crushed
*10 N-oxydiethylene-2-benzothiazolesulfeneamide
*11 N-(1,3-dimethylbutyl)-N'-phenyl-phenylenediamine Examples 13 to 23 and Comparative Examples 6 to 10

The respective components shown in Table 2 were mixed in blending proportions shown in Table 2 to prepare rubber compositions. The rubbers were prepared and vulcanized by the same methods as in Example 1.

In each of these rubber compositions, the dynamic viscoelasticity, the Mooney viscosity and the surface roughness were evaluated as indices for the physical properties of the vulcanized rubbers. The results thereof are shown in Table 2. In the dynamic viscoelasticity measuring test and the Mooney viscosity, the values were shown in terms of an index, wherein the value of Comparative Example 6 was set to a reference.

TABLE 2

| | Example | | | | | |
|---|---|---|---|---|---|---|
| | 13 | 14 | 15 | 16 | 17 | 18 |
| SBR #1502*1 | 100 | 100 | 100 | 100 | 100 | 100 |
| Carbon black*2 | 10 | 10 | 10 | 10 | 10 | 10 |
| Silica*3 | 40 | 40 | 40 | 40 | 40 | 40 |
| Silane coupling agent*4 | 4 | 4 | 4 | 4 | 4 | 4 |
| Zinc oxide | 3 | 3 | 3 | 3 | 3 | 3 |
| Stearic acid | 2 | 2 | 2 | 2 | 2 | 2 |
| Sulfur | 1.5 | 1.5 | 1.5 | 1.5 | 1.5 | 1.5 |
| Maleic acid | 0.9 | | | | | |
| Monoethyl maleate | | 1 | | | | |
| Cyclohexane-1,4-dimethanol dimaleate | | | 1 | | | |
| Mono(ω-acryloyloxyPOE(10)) trimellitate*5 | | | | 1 | | |
| Mono(2-methacryloyloxyethyl) trimellitate | | | | | 1 | |
| Mono(ω-methacryloyloxyPOP(9)) trimellitate*5 | | | | | | 1 |
| POE(8)glycerin trimaleate*5 | | | | | | |
| Glycerin dimaleate | | | | | | |
| Polybutylene maleate*6 | | | | | | |
| Poly(PEG 200) maleate*7 | | | | | | |
| Polybutylene adipate maleate*8 | | | | | | |
| N,N-dimethyldecylamine | 1.1 | 1 | 1 | 1 | 1 | 1 |
| Diethyl maleate | | | | | | |
| Mono(2-methacryloyloxyethyl) succinate | | | | | | |
| Bismaleimide resin*9 | | | | | | |
| Vulcanization-accelerating agent*10 | 2 | 2 | 2 | 2 | 2 | 2 |
| Antioxidant*11 | 1 | 1 | 1 | 1 | 1 | 1 |
| E' index | 110 | 112 | 115 | 125 | 121 | 121 |
| Mooney viscosity ($ML_{1+4}$) | 94 | 89 | 91 | 90 | 93 | 90 |
| Surface roughness | ○ | ○ | ○ | ○ | ○ | ○ |

| | Example | | | | |
|---|---|---|---|---|---|
| | 19 | 20 | 21 | 22 | 23 |
| SBR #1502*1 | 100 | 100 | 100 | 100 | 100 |
| Carbon black*2 | 10 | 10 | 10 | 10 | 10 |
| Silica*3 | 40 | 40 | 40 | 40 | 40 |
| Silane coupling agent*4 | 4 | 4 | 4 | 4 | 4 |
| Zinc oxide | 3 | 3 | 3 | 3 | 3 |
| Stearic acid | 2 | 2 | 2 | 2 | 2 |
| Sulfur | 1.5 | 1.5 | 1.5 | 1.5 | 1.5 |

TABLE 2-continued

| | | | | | |
|---|---|---|---|---|---|
| Maleic acid | | | | | |
| Monoethyl maleate | | | | | |
| Cyclohexane-1,4-dimethanol dimaleate | | | | | |
| Mono(ω-acryloyloxyPOE(10)) trimellitate*5 | | | | | |
| Mono(2-methacryloyloxyethyl) trimellitate | | | | | |
| Mono(ω-methacryloyloxyPOP(9)) trimellitate*5 | | | | | |
| POE(8)glycerin trimaleate*5 | 1 | | | | |
| Glycerin dimaleate | | 1 | | | |
| Polybutylene maleate*6 | | | 1 | | |
| Poly(PEG 200) maleate*7 | | | | 1 | |
| Polybutylene adipate maleate*8 | | | | | 1 |
| N,N-dimethyldecylamine | 1 | 1 | 1 | 1 | 1 |
| Diethyl maleate | | | | | |
| Mono(2-methacryloyloxyethyl) succinate | | | | | |
| Bismaleimide resin*9 | | | | | |
| Vulcanization-accelerating agent*10 | 2 | 2 | 2 | 2 | 2 |
| Antioxidant*11 | 1 | 1 | 1 | 1 | 1 |
| E' index | 114 | 117 | 124 | 126 | 119 |
| Mooney viscosity (ML$_{1+4}$) | 89 | 94 | 89 | 88 | 90 |
| Surface roughness | ○ | ○ | ○ | ○ | ○ |

| | Comparative Example | | | | |
|---|---|---|---|---|---|
| | 6 | 7 | 8 | 9 | 10 |
| SBR #1502*1 | 100 | 100 | 100 | 100 | 100 |
| Carbon black*2 | 10 | 10 | 10 | 10 | 10 |
| Silica*3 | 40 | 40 | 40 | 40 | 40 |
| Silane coupling agent*4 | 4 | 4 | 4 | 4 | 4 |
| Zinc oxide | 3 | 3 | 3 | 3 | 3 |
| Stearic acid | 2 | 2 | 2 | 2 | 2 |
| Sulfur | 1.5 | 1.5 | 1.5 | 1.5 | 1.5 |
| Maleic acid | | | | | |
| Monoethyl maleate | | | | | |
| Cyclohexane-1,4-dimethanol dimaleate | | | | | |
| Mono(ω-acryloyloxyPOE(10)) trimellitate*5 | | | | | |
| Mono(2-methacryloyloxyethyl) trimellitate | | | | | |
| Mono(ω-methacryloyloxyPOP(9)) trimellitate*5 | | | | | |
| POE(8)glycerin trimaleate*5 | | | | | |
| Glycerin dimaleate | | | | | |
| Polybutylene maleate*6 | | | | | |
| Poly(PEG 200) maleate*7 | | | | | |
| Polybutylene adipate maleate*8 | | | | | |
| N,N-dimethyldecylamine | | | | 2 | |
| Diethyl maleate | | 2 | | | |
| Mono(2-methacryloyloxyethyl) succinate | | | | 2 | |
| Bismaleimide resin*9 | | | | | 2 |
| Vulcanization-accelerating agent*10 | 2 | 2 | 2 | 2 | 2 |
| Antioxidant*11 | 1 | 1 | 1 | 1 | 1 |
| E' index | 100 | 98 | 95 | 110 | 123 |
| Mooney viscosity (ML$_{1+4}$) | 100 | 95 | 89 | 96 | 101 |
| Surface roughness | ○ | ○ | ○ | ○ | X |

Examples 24 to 26 and Comparative Examples 11 to 15

The respective components shown in Table 3 were mixed in blending proportions shown in Table 3 to prepare rubber compositions. The rubbers were prepared and vulcanized by the same methods as in Example 1.

In each of these rubber compositions, the dynamic viscoelasticity, the Mooney viscosity and the surface roughness were evaluated as the indices for the physical properties of the vulcanized rubbers. The results thereof are shown in Table 3. In the dynamic viscoelasticity measuring test and the Mooney viscosity, the values were shown in terms of an index, wherein the value of Comparative Example 11 was set to a reference.

TABLE 3

| | Example | | |
|---|---|---|---|
| | 24 | 25 | 26 |
| SBR #1502*1 | 100 | 100 | 100 |
| Carbon black*2 | 10 | 10 | 10 |
| Silica*3 | 40 | 40 | 40 |
| Silane coupling agent*4 | 4 | 4 | 4 |
| Zinc oxide | 3 | 3 | 3 |
| Stearic acid | 2 | 2 | 2 |
| Sulfur | 1.5 | 1.5 | 1.5 |
| Di(N,N-dimethylaminohexyl) maleate | 2 | | |
| Mono[N-dodecyl-N-(2-hydroxyethyl)aminoethyl] | | 2 | |

TABLE 3-continued

| | | | |
|---|---|---|---|
| Maleate | | | |
| Di(N,N-dimethylaminohexyl) fumarate | | 2 | |
| Diethyl maleate | | | |
| N,N-dimethyldecylamine | | | |
| Mono(2-methacryloyloxyethyl) succinate | | | |
| Bismaleimide resin*9 | | | |
| Vulcanization-accelerating agent*10 | 2 | 2 | 2 |
| Antioxidant*11 | 1 | 1 | 1 |
| E' index | 118 | 113 | 122 |
| Mooney viscosity (ML$_{1+4}$) | 94 | 97 | 93 |
| Surface roughness | ○ | ○ | ○ |

| | Comparative Example | | | | |
|---|---|---|---|---|---|
| | 11 | 12 | 13 | 14 | 15 |
| SBR #1502*1 | 100 | 100 | 100 | 100 | 100 |
| Carbon black*2 | 10 | 10 | 10 | 10 | 10 |
| Silica*3 | 40 | 40 | 40 | 40 | 40 |
| Silane coupling agent*4 | 4 | 4 | 4 | 4 | 4 |
| Zinc oxide | 3 | 3 | 3 | 3 | 3 |
| Stearic acid | 2 | 2 | 2 | 2 | 2 |
| Sulfur | 1.5 | 1.5 | 1.5 | 1.5 | 1.5 |
| Di(N,N-dimethylaminohexyl) maleate | | | | | |
| Mono[N-dodecyl-N-(2-hydroxyethyl)-aminoethyl] maleate | | | | | |
| Di(N,N-dimethylaminohexyl) fumarate | | | | | |
| Diethyl maleate | | 2 | | | |
| N,N-dimethylstearylamine | | | 2 | | |
| Mono(2-methacryloyloxyethyl) succinate | | | | 2 | |
| Bismaleimide resin*9 | | | | | 2 |
| Vulcanization-accelerating agent*10 | 2 | 2 | 2 | 2 | 2 |
| Antioxidant*11 | 1 | 1 | 1 | 1 | 1 |
| E' index | 100 | 98 | 93 | 110 | 123 |
| Mooney viscosity (ML$_{1+4}$) | 100 | 95 | 88 | 96 | 101 |
| Surface roughness | ○ | ○ | ○ | ○ | X |

Examples 27 to 31 and Comparative Example 16

The respective components shown in Table 4 were mixed in blending proportions shown in Table 4 to prepare rubber compositions. The rubbers were prepared and vulcanized by the same methods as in Example 1.

In each of these rubber compositions, the dynamic viscoelasticity, the Mooney viscosity and the surface roughness were evaluated. The results thereof are shown in Table 4. In the dynamic viscoelasticity measuring test and the Mooney viscosity, the values were shown in terms of an index, wherein the value of Comparative Example 16 was set to a reference.

TABLE 4

| | Comparative Example 16 | Example | | | | |
|---|---|---|---|---|---|---|
| | | 27 | 28 | 29 | 30 | 31 |
| SBR 1712*12 | 110 | 110 | 110 | 110 | 110 | 110 |
| RSS #3*13 | 20 | 20 | 20 | 20 | 20 | 20 |
| Carbon black*14 | 20 | 20 | 20 | 20 | 20 | 20 |
| Silicic acid hydrate*15 | 50 | 50 | 50 | 50 | 50 | 50 |
| Silane coupling agent*4 | 4 | 4 | 4 | 4 | | 4 |
| Zinc oxide | 3 | 3 | 3 | 3 | | 3 |
| Stearic acid | 1 | 1 | 1 | 1 | 1 | 1 |
| Sulfur | 1.5 | 1.5 | 1.5 | 1.5 | | 1.5 |
| 2-Methacryloyloxyethyl hexahydrophthalte | | 2 | | 4 | 8 | |
| 2-Acryloyloxyethyl phthalate | | | 2 | | | |
| Mono(ω-acryloyloxyPOE(10)) trimellitate*5 | | | | | | 2 |
| Aroma oil | 5 | 5 | 5 | 5 | 5 | 5 |
| Wax | 1 | 1 | 1 | 1 | 1 | 1 |
| Vulcanization-accelerating agent DM*16 | 0.5 | 0.5 | 0.5 | 0.5 | 0.5 | 0.5 |
| Vulcanization-accelerating agent NS*17 | 1 | 1 | 1 | 1 | 1 | 1 |
| Antioxidant*18 | 1 | 1 | 1 | 1 | 1 | 1 |
| E' index | 100 | 149 | 155 | 179 | 191 | 171 |
| Mooney viscosity (ML$_{1+4}$) | 100 | 88 | 88 | 83 | 79 | 98 |
| Surface roughness | Δ | ○ | ○ | ○ | ○ | ○ |

*12manufactured by JSR Co., Ltd.
*13Natural rubber
*14Seast KH manufactured by Tokai Carbon Co., Ltd.
*15Nipseal AQ ($S_{HG}$ = 140 m$^2$/g) manufactured by Nippon Silica Co., Ltd.
*16Dibenzothiazyl disulfide
*17N-tert-butyl-2-benzothiazylsulfeneamide
*186C[N-phenyl-N'-(1,3-dimethylbutyl)p-phenylenediamine It was confirmed that a driving stability of a tire was improved by using the rubber composition of the present invention for a tread of a tire for automobiles having a size of 205/60R15.

INDUSTRIAL APPLICABILITY

The rubber composition in the present invention is excellent in the dispersibility of an inorganic filler, so that it does not elevate a viscosity of a non-vulcanized rubber and does not damage the processability, and it does not bring about roughening on the surface of rubber and is improved in a storage modulus by blending the storage modulus-improving agent of the present invention. Further, when this rubber composition is used for a tread of a pneumatic tire, A rise in the driving stability is observed.

What is claimed is:

1. A rubber composition comprising (A) a natural rubber and/or a diene base synthetic rubber, (B) an inorganic filler and (E) acrylate or methacrylate having a molecular weight of 250 or more, represented by Formula (IV):

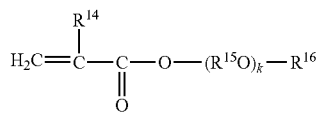 (IV)

wherein $R^{14}$ represents hydrogen or methyl; $R^{15}$ represents ethylene group or propylene group; $R^{16}$ represents a saturated or unsaturated alkyl group, an aryl group or a group which is substituted with —OH, —COON or —(C=O)— partially or at two or more parts and $R^{16}$ has a carboxyl group at an end of $R^{16}$ part; and k is an integer of 0 to 30.

2. A rubber composition as claimed in claim 1, comprising 10 to 140 mass parts of the component (B) per 100 mass parts of the component (A).

3. A rubber composition as claimed in claim 1, comprising 0.1 to 10 mass parts of the component (E) per 100 mass parts of the component (A).

4. A rubber composition as claimed in claim 1, wherein the inorganic filler (13) is silica.

5. A rubber composition as claimed in claim 1, further comprising (F) an aliphatic amine.

6. A rubber composition as claimed in claim 5, wherein the aliphatic amine (F) is an aliphatic tertiary amine.

7. A rubber composition as claimed in claim 1, further comprising (G) a silane coupling agent in a proportion of 1 to 20 mass % based on the component (B).

8. A rubber composition as claimed in claim 7, wherein the silane coupling agent (G) is at least one selected from a compound represented by Formula (V):

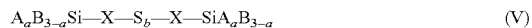 (V)

wherein a represents $C_cH_{2c+1}O$; c is an integer of 1 to 3 or a chlorine atom; B represents an alkyl group having 1 to 3 carbon atoms; X represents a saturated or unsaturated alkylene group having 1 to 9 carbon atoms or an arylene group having 7 to 15 carbon atoms; a is an integer of 1 to 3; and b is an integer of 1 or more and may have distribution, provided that when a is 1, two B's may be the same or different, and when a is 2 or 3, two or three A's may be the same or different, a compound represented by Formula (VI):

 (VI)

wherein A, B, X and a are the same as described above; and Y represents a mercapto group, a vinyl group, an amino group, a glycidoxy group or an epoxy group, and a compound represented by Formula (VII):

 (VII)

wherein A, B, X, a and b are the same as described above; and Z represents a benzothiazolyl group, an N,N-dimethylthiocarbamoyl group, a methacryloyl group or a saturated or unsaturated hydrocarbon group having 1 to 15 carbon atoms.

9. A tire characterized by using the rubber composition as claimed in any of claims 1 to 8 for a tread member.

* * * * *